US011548043B2

(12) United States Patent
Procksch et al.

(10) Patent No.: US 11,548,043 B2
(45) Date of Patent: Jan. 10, 2023

(54) METHOD FOR DETECTING AND REMOVING BUILDUP ON A COMPONENT, SYSTEM AND COMPUTER PROGRAM (71) Applicant: SIEMENS AKTIENGESELLSCHAFT, Munich (DE)

(72) Inventors: Andreas Procksch, Nuremberg (DE); Dan Niculae Fodor, Leinburg-Entenberg (DE)

(73) Assignee: Siemens Aktiengesellschaft, Munich (DE)

( * ) Notice: Subject to any disclaimer, the term of this patent is extended or adjusted under 35 U.S.C. 154(b) by 116 days.

(21) Appl. No.: 16/644,784

(22) PCT Filed: Aug. 22, 2018

(86) PCT No.: PCT/EP2018/072669
§ 371 (c)(1),
(2) Date: Mar. 5, 2020

(87) PCT Pub. No.: WO2019/048234
PCT Pub. Date: Mar. 14, 2019

(65) Prior Publication Data
US 2021/0069757 A1  Mar. 11, 2021

(30) Foreign Application Priority Data

Sep. 6, 2017  (EP) ..................................... 17189596

(51) Int. Cl.
B08B 7/02  (2006.01)
B08B 9/027  (2006.01)
(Continued)

(52) U.S. Cl.
CPC ................ *B08B 7/02* (2013.01); *B08B 9/027* (2013.01); *B08B 9/08* (2013.01); *B08B 13/00* (2013.01); *B65D 88/66* (2013.01); *G01M 7/025* (2013.01)

(58) Field of Classification Search
CPC .. B08B 7/02; B08B 9/027; B08B 9/08; B08B 13/00; B65D 88/66; G01M 7/025
See application file for complete search history.

(56) References Cited

U.S. PATENT DOCUMENTS 4,315,399 A * 2/1982 Pfeifer ................ B08B 7/028
57/302
6,620,255 B1 * 9/2003 Dar ........................ G02B 6/25
134/1
(Continued)

FOREIGN PATENT DOCUMENTS

CN       1813172 A     8/2006
CN     101610959 A    12/2009
(Continued)

OTHER PUBLICATIONS

The Free Dictionary, Fourier Spectrum (Year: 2003).*
(Continued)

*Primary Examiner* — Sharidan Carrillo
(74) *Attorney, Agent, or Firm* — Henry M. Feiereisen LLC (57) ABSTRACT In a method for operating a system, a first vibration is imparted to a component of the system and the first vibration of the component is detected by a sensor. The sensor generates a sensor signal for transmission to a control device, which analyzes the sensor signal and determines whether a buildup is present on the component based upon
(Continued)

the analysis of the sensor signal. A second vibration is imparted to the component to remove the buildup when the buildup has been detected.

10 Claims, 3 Drawing Sheets

(51) Int. Cl.
  *B08B 9/08* (2006.01)
  *B08B 13/00* (2006.01)
  *B65D 88/66* (2006.01)
  *G01M 7/02* (2006.01)

(56) References Cited

U.S. PATENT DOCUMENTS

| | | |
|---|---|---|
| 2006/0124054 A1 | 6/2006 | Struschka et al. |
| 2007/0012334 A1* | 1/2007 | Wolters .................. B08B 7/026 134/1 |
| 2008/0054762 A1* | 3/2008 | Ludwiczak ............ G01N 29/07 73/579 |
| 2008/0072667 A1 | 3/2008 | Mueller et al. |
| 2008/0100584 A1* | 5/2008 | Hague ................... G06F 3/0416 345/173 |
| 2010/0038377 A1 | 2/2010 | Pages et al. |
| 2012/0174671 A1 | 7/2012 | Urban |
| 2013/0030724 A1* | 1/2013 | Friedlander ............ G01N 29/14 702/56 |
| 2013/0146084 A1* | 6/2013 | Wetterich .................. B08B 7/02 15/94 |
| 2018/0221921 A1* | 8/2018 | Magee .................. H01L 41/042 |
| 2018/0246323 A1* | 8/2018 | Fedigan .................... B08B 3/12 |

FOREIGN PATENT DOCUMENTS

| | | |
|---|---|---|
| CN | 102549399 A | 7/2012 |
| CN | 104309956 A | 1/2015 |
| CN | 205613499 U | 10/2016 |
| JP | H03275488 A | 12/1991 |
| KR | 101355766 B1 | 1/2014 |
| KR | 101576653 B1 | 12/2015 |
| WO | WO 2013110137 A1 | 8/2013 |

OTHER PUBLICATIONS

PCT International Examination Report and Written Opinion of International Examination Authority dated Dec. 19, 2018 corresponding to PCT International Application No. PCT/EP2018/072669 filed Aug. 22, 2018.

* cited by examiner

METHOD FOR DETECTING AND REMOVING BUILDUP ON A COMPONENT, SYSTEM AND COMPUTER PROGRAM

CROSS-REFERENCES TO RELATED APPLICATIONS

This application is the U.S. National Stage of international Application No. PCT/EP2018/072669, filed Aug. 22, 2018, which designated the United States and has been published as International Publication No. WO 2019/048234 A1 and which claims the priority of European Patent Application, Ser. No. 17189596.4, filed Sep. 6, 2017, pursuant to 35 U.S.C. 119(a)-(d).

BACKGROUND OF THE INVENTION

The invention relates to a method for operating a system, and to a system. The invention further relates to a computer program product.

In the treatment of solid material that is processed industrially, buildup of adhering material occurs e.g. on hoppers. This buildup can adversely affect the operation of the hopper.

Particularly in the case of hoppers that are difficult to access or in the interior of a mill, it is also difficult to detect this buildup.

The buildup usually consists of a solidified accumulation of particles and possibly moisture. In the case of a tube mill hi particular, it is termed a "frozen charge".

US 2006/0124054 A1 discloses a conically shaped hopper which is attached to a reaction vessel.

The object of the invention is therefore to detect and/or remove material buildup on a component.

SUMMARY OF THE INVENTION

According to one aspect of the invention, the object is achieved by a method for operating a system, wherein the system includes a component, wherein the component may be subject to buildup, wherein the component is assigned a sensor and an excitation unit, wherein the excitation unit imparts a first vibration to the component, wherein the sensor detects the first vibration of the component and the sensor provides a sensor signal to a control device, wherein it is determined on the basis of analysis of the sensor signal whether the component has buildup, wherein it is determined on the basis of the sensor signal whether a buildup is present on the component and, if a buildup is detected, the buildup is removed by applying a second vibration.

According to another aspect of the invention, the object is achieved by a system which includes a component and a control device, wherein the component is assigned at least one first excitation unit and at least one sensor, wherein the first excitation unit is used to impart at least one first vibration to the component, wherein the sensor is designed to determine the frequency, amplitude and/or phase of the first vibration, wherein the control device is designed to carry out a method as claimed in one of the preceding claims using the first excitation unit.

According to still another aspect of the invention, the object is also achieved by a computer program product for installation on a processor unit assigned to a control device, wherein the computer program product is designed to carry out the method as set forth above when it is executed on the processor unit.

The component is preferably designed as a hopper, as a grinding tube, or as a collecting container. The system is preferably designed as a (tube) mill or vertical mill, as a filling device or as a collecting device.

Advantageous embodiments of the invention are set forth in the dependent claims.

The invention is based on the idea that a buildup adheres to a surface of a component, e.g. in a hopper or grinding tube. The buildup on the surface of the component changes the vibrational characteristics of the component. In particular, the resonance frequency of the component is changed.

The vibration is preferably imparted by means of an excitation unit.

A first vibration is advantageously imparted to the component. The buildup is detected by means of a first vibration and the buildup is removed from the component by means of a second vibration. Instead of imparting a first vibration, another method for determining buildup can also be used. In the case of a grinding tube, for example, rotation with simultaneous measurement of the torque can take place, wherein an increased countertorque indicates a buildup of material on a grinding tube.

The first and/or the second vibration can be imparted to the component by imparting a periodic, in particular sinusoidal, vibration and/or by means of at least one impulse.

A vibration is preferably excited with one of the resonance frequencies of the component.

The buildup can also be detected using some other method and removed from the component by means of the second vibration.

Preferably, the respective resonance frequency is initially determined with the aim of ascertaining whether a buildup is present. On the basis of the resonance frequency or resonance frequencies determined, the surface or the component is rendered free of buildup, or the buildup is at least reduced, by means of mechanical excitation of the surface or the component.

The buildup is detected by analyzing a sensor signal. The sensor signal is provided by a (vibration) sensor. The sensor determines the vibrations of a surface of the component. The excitation unit excites the component, in particular a surface of the component, to vibrate.

The excitation unit can be implemented as a piezo element which can be located between the component and a mounting of the component.

The excitation unit preferably has a plunger, wherein the plunger collides with the component at settable time intervals. The collision imparts an impulse to the surface. The impulse causes the component to vibrate. The frequency of the vibration, the phase shift and/or the amplitude of the vibration depend in particular on the component itself. If material has built up on a surface of the component, the frequency, the respective resonance frequency, amplitude and/or phase of the imparted vibration, in particular its resonant behavior, generally changes. This change can be registered by means of the sensor or a plurality of sensors and a buildup is inferred on the basis of the analysis of the vibration. If such a buildup is present, the material can be removed using the excitation unit by applying second vibrations, in particular to excite the respective resonance, or by means of powerful impulses.

The at least second vibration is preferably imparted at a frequency which is at least close to a respective resonance frequency of the component having the buildup. The resonance frequency or the resonance frequencies are determined by means of the sensor signal.

In the case of the method for operating a system, the system comprises a component, wherein the component may be subject to buildup, wherein the component is assigned a sensor and at least one excitation unit, wherein the excitation unit imparts a first and/or a second vibration to the component, wherein the sensor detects the first vibration of the component and provides a sensor signal to a control device, wherein the sensor signal is used to determine whether a buildup is present on the component and/or wherein, in particular if a buildup is detected, the buildup is removed by the application of a second vibration.

The component can be a hopper, a grinding tube or a loading area. The system is preferably an industrial system, preferably from the field of heavy industry, mining or base material production. In addition, the method can also be used for systems in industrial food processing industries.

A buildup can include dust or small pellicles such as coal dust, ground rock and/or a binding agent such as oil or water.

The buildup changes the vibrational characteristic, in particular the respective resonance frequency of the component. A component usually has a plurality of resonance frequencies. Here, a resonance frequency is selected that can be easily excited.

The buildup is preferably registered with the first vibration and removed from the component with the second vibration.

Alternatively or additionally, a countertorque or a counterforce can be determined by means of the sensor in the case of a rotatable component. The sensor is used in particular to determine the current of the respective drive which provides the torque for the rotating component. On the basis of the countertorque or the counterforce, it can be inferred that a buildup is present on the component.

The excitation unit can be designed as an impulse generator which can impart impulses of a predefinable magnitude to the component at definable times. The excitation unit can also be designed such that a vibration is imparted directly to the component by a vibrating element.

The excitation unit can in particular be designed as a piezo element, wherein the piezo element is attached directly to the component.

The sensor is preferably designed as a vibration sensor. The sensor detects the amplitude and/or the vibration frequency. The sensor is preferably disposed in a region of the component which appears prone to buildup, such as near a corner or edge of the component.

A plurality of sensors are preferably assigned to a component. The sensors can be disposed at different locations on the component. For example, one sensor is disposed near an excitation unit and another sensor is disposed near a position that is often subject to buildup. The sensor for determining a counterforce or a countertorque can also be assigned to a drive for the component.

A comparison of the sensor signals of the sensors mounted at different locations of the component preferably takes place. A comparison enables a change in the phase, respective resonance frequency, vibration frequency and/or amplitude of the vibration to be detected.

The evaluation of the at least one sensor signal preferably takes place in the control unit or in a processor unit assigned to the control unit. A change in the at least one sensor signal over a longer period of time, e.g. 10 days, indicates a buildup.

If a buildup is present, the control device activates the excitation unit. By means of the excitation unit, in particular, impulses or vibrations are imparted to the component. The vibrations or impulses are used to remove the buildup from the component.

Using the method described here, a buildup can be easily detected without the component being significantly impaired or the system having to interrupt its operation.

In an advantageous embodiment of the invention, when a buildup is determined, the buildup is removed by applying the second vibration.

The amplitude of the first vibration is preferably lower than the amplitude of the second vibration. In addition, the first vibration can be imparted to the component using a weak impulse and the second vibration can be imparted to the component using a strong impulse. The derivative and the amplitude of the strong impulse for exciting the second vibration are advantageously higher than those of the weak impulse for exciting the first vibration.

Registering the presence of an impulse with the first vibration enables the amplitude and/or the frequency of the first vibration to be selected with regard to registering the buildup on the component.

Registering the presence of an impulse with the second vibration enables the amplitude and/or the frequency of the second vibration to be selected with regard to removing the buildup from the component.

In a further advantageous embodiment of the invention, the sensor determines a frequency, an amplitude and/or a phase of the respective vibration and provides the sensor signal on the basis of the frequency, amplitude and/or phase.

Depending on the component, a plurality of sensors can be positioned at a plurality of locations on the component. The sensors are preferably disposed in different directions and/or distances from the at least one point at which the excitation unit applies the first and/or second vibration to the component.

By determining a phase difference of the respectively determined vibration, a different propagation speed of the vibration through the component can be detected. The speed of propagation of a vibration can indicate a buildup at a position on the component.

By determining the amplitude, phase or frequency of the first vibration, it is advantageously possible to reliably determine the presence of a buildup.

In an advantageous embodiment of the invention, the first vibration and the second vibration are imparted by means of the excitation unit.

The imparting causes the respective vibration to be excited.

In this way, the buildup is advantageously detected and removed from the component by means of an excitation unit.

The excitation unit can be connected to the component in a fixed manner and impart the vibration to the component at a particular point.

Using a single excitation unit enables the system to be manufactured or expanded particularly cost-effectively.

In a further advantageous embodiment of the invention, the first vibration is excited using a first excitation unit and the second vibration is excited using a second excitation unit.

Using two excitation units enables the respective excitation unit to be designed according to its purpose.

In addition, the dual implementation of the excitation unit allows improved positioning of the respective excitation unit.

In another advantageous embodiment, the presence of buildup is determined on the basis of a variance in a Fourier spectrum of the respective sensor signal.

Analyzing the frequency spectrum of the vibrations propagating through the component with or without buildup provides a particularly simple means of detecting a buildup. A variance in the Fourier spectrum can be established on the basis of a plurality of measurements. The Fourier spectrum is preferably provided with a fast Fourier transform. If the Fourier spectrum shows a variance between measurements performed at different times, a buildup may be present.

Analyzing the Fourier spectrum provides a particularly simple and reliable means of determining the presence of a buildup.

In a further advantageous embodiment of the invention, the frequency of the first and/or the second vibration increases over time from 0.1 to 1 kHz, preferably between 1 and 50 Hz.

The respective frequency advantageously begins with a low value, in particular 0.5 Hz. The frequency advantageously increases as a function of time to a high value, in particular 500 Hz.

In an embodiment in which the respective vibration is caused by impulses imparted to the component, the time interval between two impulses decreases. Vibrations of increasing frequency are excited by the impulses.

The respective resonance frequencies of the component are excited by a continuous increase in the frequency of the vibrations. In addition, particularly simple analysis of the sensor signal is possible because a component can be excited in particular in the region of the respective resonance frequency.

In a further advantageous embodiment of the invention, the first and/or the second excitation unit impart to the component vibrations of a respective resonance frequency of the component.

First and/or second vibrations close to the respective resonance frequency are preferably imparted to the component.

Applying a second vibration with a resonance frequency or one close to the respective resonance frequency makes any buildup particularly easy to remove.

For detection of buildup, a first vibration of a resonance frequency or dose to the respective resonance frequency of the component is preferably applied.

As the respective resonance frequency of the component changes when buildup is present, the change can be detected particularly easily.

In a further advantageous embodiment of the invention, the first vibration and/or the second vibration are imparted by means of impulses.

The impulses are preferably imparted to the component by a plunger of a first and/or a second excitation unit. The time between the respective impulses is preferably designed to decrease. The intensity of the impulses preferably increases from impulse to impulse. The respective time interval between the respective impulses can also be based on a resonance frequency of the component. The time interval between the impulses preferably remains at least largely constant when one of the resonance frequencies is excited.

Vibrations can be imparted to the component in a simple manner by means of impulses.

The system comprises a component and a control device, wherein at least one first excitation unit and optionally a second excitation unit and at least one sensor is assigned to the component, wherein the first excitation unit is designed to impart at least one first vibration and/or a second vibration to the component, wherein the sensor is designed to determine the frequency, amplitude and/or phase of the first vibration, wherein the control device is designed to carry out a method as claimed in one of the preceding claims by means of the first excitation unit and the optional second excitation unit.

The system preferably also includes the sensor and the excitation unit.

The component is preferably a hopper or a discharging pipe. The system advantageously comprises the component, wherein the component is connected to at least one sensor. The respective sensor is used to determine the vibration that was imparted to the component by the respective excitation unit.

In a further advantageous embodiment of the invention, the system has a second excitation unit, the second excitation unit being designed to impart a second vibration.

The first excitation unit can preferably be positioned on the component at the location where buildup is likely to occur. The effect of the buildup on the vibration of the component is greatest at this position.

The second excitation unit is preferably positioned at a location where the imparting of a vibration only minimally affects the operation of the component in the system. It is also advantageous for the second vibration to be imparted at a location where the component has high stability.

The computer program product is designed for installation on a processor unit assigned to a control device, wherein the computer program product is designed to carry out the method described here when it is executed on the processor unit.

The computer program product is preferably used to evaluate the respective sensor signal as to whether any buildup is present on the component. The evaluation advantageously also indicates the type of buildup by analyzing the frequency spectrum or analyzing the respective amplitude or phase of the first vibration.

The computer program product preferably analyzes the respective sensor signal by Fourier analysis of the respective sensor signal.

BRIEF DESCRIPTION OF THE DRAWING

The invention will now be presented and explained in more detail with reference to accompanying drawings. The features shown in the figures may be combined by persons skilled in the art to produce new embodiments without departing from the invention.

DETAILED DESCRIPTION OF PREFERRED EMBODIMENTS

Figure 1:
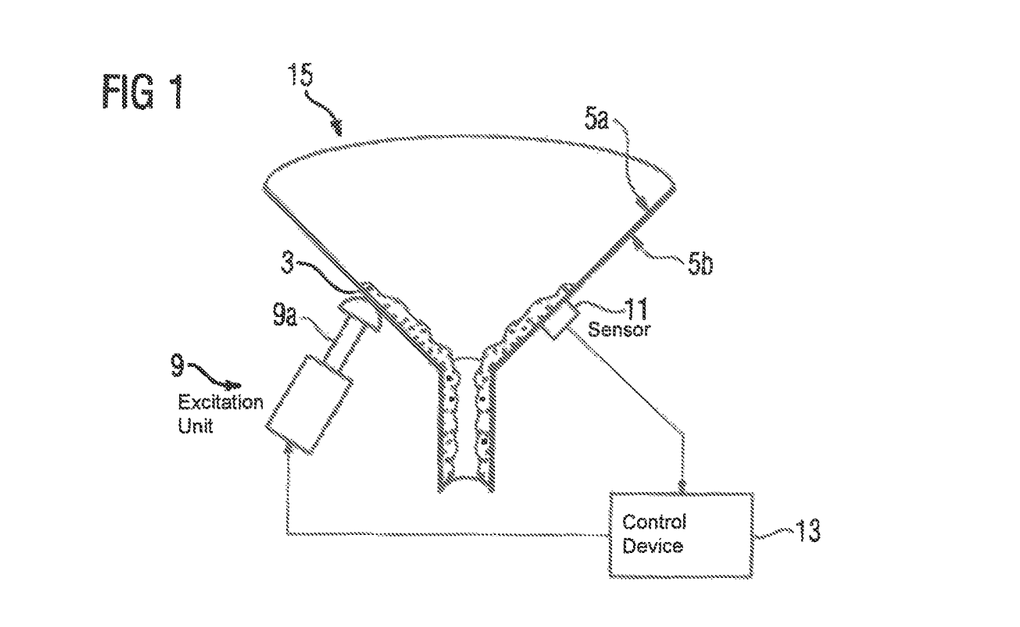
FIG. 1 shows a hopper with buildup.

FIG. 1 shows a hopper 15. The hopper 15 has a buildup 3 on its first surface 5a. The first surface 5a corresponds to the inward facing surface of the hopper 15. The hopper 15 has a sensor 11 on the second surface 5b. An excitation unit 9 is disposed facing the second surface 5b of the hopper 15. The excitation unit 9 is used to excite vibrations of the hopper 15. The vibrations are detected by the sensor 11 in their frequency and amplitude. The sensor 11 provides a sensor signal to the control device 13. The sensor signal contains the information concerning the amplitude and frequency of the vibration.

The control device 13 is used to evaluate the sensor signal. On the basis of the sensor signal, the control device 13 can be used to determine whether there is any buildup 3 on the first surface 5a of the hopper 15.

The excitation unit 9 has a plunger 9a. The plunger 9a is used to excite a first vibration of the hopper 15. The first vibration is used to determine whether a buildup is present. The first vibration is preferably excited by one or more impulses imparted to the hopper 15.

If a buildup is detected by the control device 13, it is removed from the surface of the hopper 15 by means of the excitation unit 9. For this purpose, the hopper 15 is excited to a second vibration using impulses. The time period dt between the respective impulses can be varied. The time period dt is preferably selected such that the second vibration corresponds to the resonance Res of the hopper 15 having the buildup 3.

The excitation unit 9 is positioned in such a way that the plunger 9a excites the hopper to the second vibration in the region of the buildup.

Figure 2:
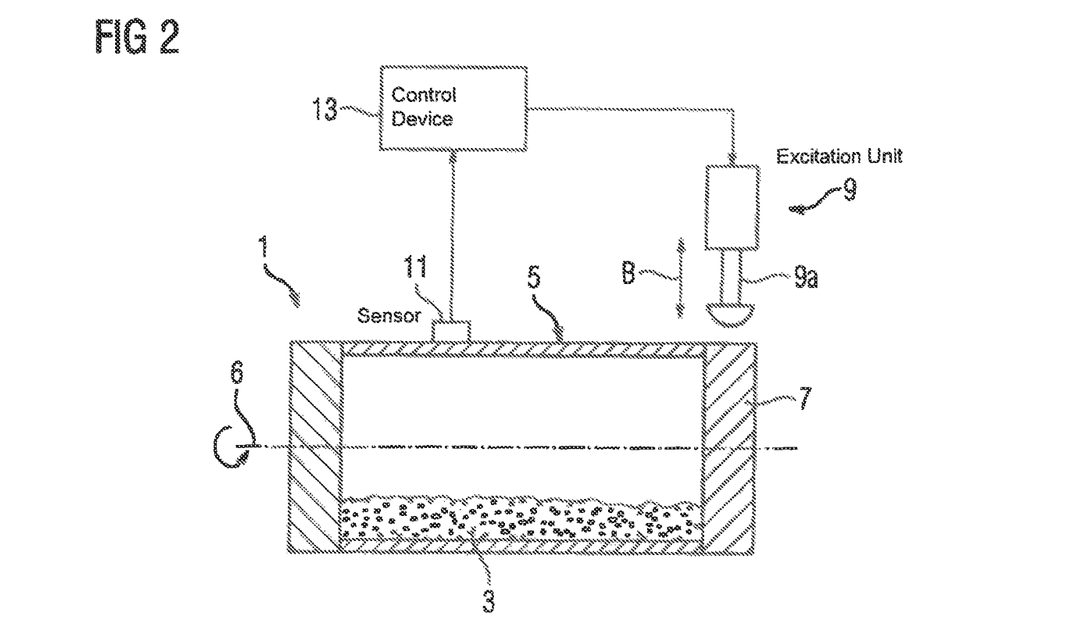
FIG. 2 shows a grinding tube.

In FIG. 1, the component 1, 15 is designed as a hopper 15. In FIG. 2, the component 1, 15 is designed as a grinding tube 1.

FIG. 2 shows a grinding tube 1. The grinding tube 1 is part of a tube mill. The grinding tube 1 has a buildup 3 in its interior. The buildup 3 is in particular a frozen charge. The grinding tube 1 has a casing 5, wherein the casing 5 has the buildup 3 on its (inward-facing) second surface 5a. The grinding tube 1 has the sensor 11 on the second surface 5b. The sensor is used to determine the first vibration, in particular the amplitude and/or frequency of the first vibration.

The grinding tube 1 is rotated about its axis of rotation 6 by a drive (not shown). The rotation of the grinding tube 1 about its axis of rotation 6 is indicated by the curved arrow.

If a buildup 3 is present as a frozen charge, no vibration due to movement of the charge in the grinding tube 1 is detected when the grinding tube is rotated.

The sensor is used to determine the frequency and/or amplitude of the first vibration.

Without rotation of the grinding tube 1, the first vibration can alternatively or additionally be excited by means of the excitation unit 9.

The excitation unit 9 is advantageously disposed such that the plunger 9a excites the vibration on one of the side plates 7 of the grinding tube 1.

If a buildup 3 is present, the control device 13 causes the excitation unit 9 to impart a second vibration to the grinding tube 1, in particular by means of impulses. The second vibration is likewise excited by impulses applied to the side plates 7. The second vibration is excited by means of impulses. A time period dt elapses between the respective impulses.

Figure 3:
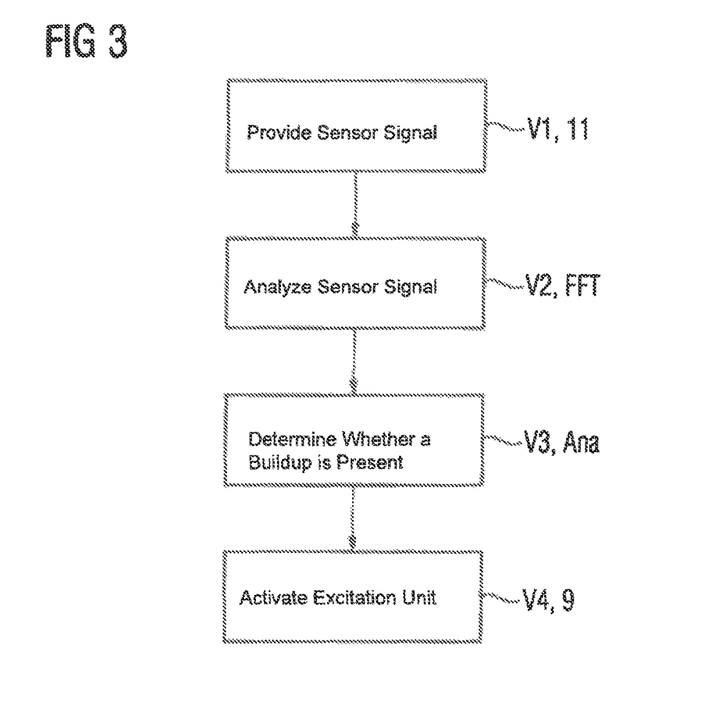
FIG. 3 shows an exemplary process diagram.

FIG. 3 shows an exemplary process diagram. In a first step V1, the sensor 11 provides the sensor signal. The sensor signal is analyzed in a second step V2. The analysis is preferably carried out using a fast Fourier transform FFT. The fast Fourier transform FFT provides a frequency spectrum of the first vibration. The frequency spectrum usually gives indications of the presence of buildup 3.

In the third step V3, an analysis Ana is used to determine whether a buildup is present. In addition, the analysis Ana can be used to determine the particular resonance frequency of the component 1, 15 having the buildup.

Based on the analysis Ana, the excitation unit 9 is activated in a fourth step V4. The excitation unit 9 excites a second vibration of the component 1, 15, in particular of the respective surface 5a, 5b of the component 1, 15.

Alternatively, in the first step V1, a counterforce or a countertorque can be also determined by the sensor 11. The presence of a buildup 3 can be inferred from a change in the counterforce or countertorque.

Figure 4:
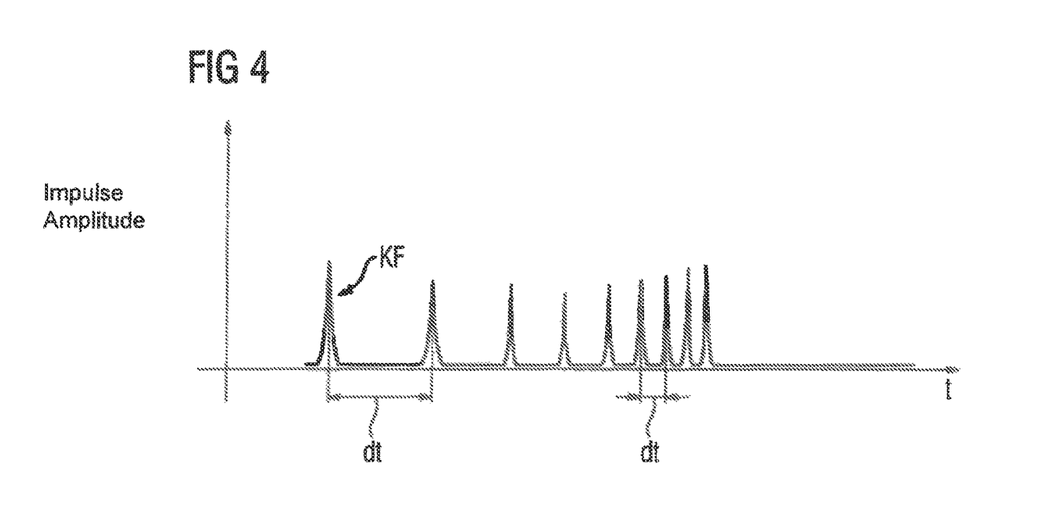
FIG. 4 shows an impulse timing sequence.

FIG. 4 shows a timing sequence of the impulses KF over time t. The impulses are used to excite the first and/or the second vibration. It is shown that the length of time dt between the respective impulses KF decreases. A resonance Res can be excited by the decrease in the respective length of time dt between the impulses KF, wherein the frequency of the resonance Res does not initially need to be known. Due to the decreasing time period dt, buildup can be removed from a surface 5a, 5b of the component 1, 15 even without an analysis Ana, in particular by exciting a resonance.

Figure 5:
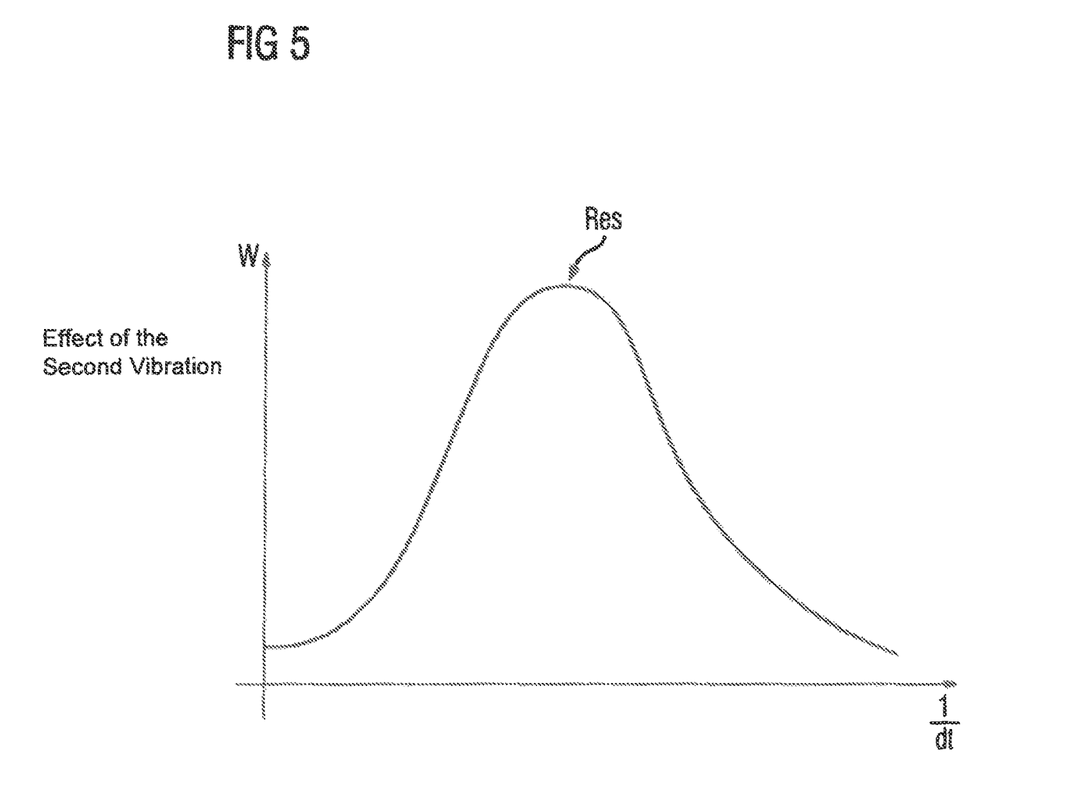
FIG. 5 shows a resonance curve.

FIG. 5 shows a resonance curve. The resonance curve shows that the effect W of the second vibration on the buildup 3 increases towards a resonance Res. When the resonance Res is present, the effect W of the second vibration is at its strongest, i.e. a buildup 3 is best removed. Accordingly, it is advantageous for the time dt between the impulses to be made to decrease, as the resonance Res of a component 1, 15 is normally excited in this way.

In summary, the invention relates to a method and a device for detecting and removing a buildup 3. The first vibration, which is excited e.g. by an excitation unit 9, is detected using a sensor. The sensor 11 provides a sensor signal, wherein the sensor signal is analyzed in a control device 13 for the presence of a buildup 3. If the analysis Ana indicates a buildup 3, a second vibration is imparted to the component 1, 15 by means of the excitation unit 9. The second vibration is used to remove the buildup 3. By removing the buildup 3, the component 1, 15 or the system comprising the component 1, 15 can be operated for longer without maintenance.

The invention claimed is:
1. A method for removing buildup from a component, said method comprising:
  imparting a first vibration to an exterior surface of a component, said component subject to a buildup on an interior surface of said component, said component comprising a hopper, or a grinding tube of a mill;
  detecting the first vibration of the component by a sensor operably connected to the exterior surface of the component;
  providing a sensor signal from the sensor to a control device;
  analyzing the sensor signal by the control device;
  detecting whether the buildup is present on the interior surface of the component based upon analysis of the sensor signal; and
  imparting a second vibration to the exterior surface of the component to remove the buildup on the interior surface of the component when the buildup on the interior surface of the component has been detected, wherein the second vibration is caused by impulses imparted to the component with a continuous increase in frequency of the second vibration as a function of time such that a time interval between said impulses decreases, wherein the continuous increase in the frequency of the second vibration results in excitation of resonance frequencies of the component.

2. The method of claim 1, wherein the sensor determines a frequency, an amplitude and/or a phase of the first vibration and provides the sensor signal based on the frequency, amplitude and/or phase.

3. The method of claim 1, wherein the first and second vibrations are imparted by an excitation unit, an amplitude of the first vibration being lower than an amplitude of the second vibration.

4. The method of claim 1, wherein the first vibration is excited by a first excitation unit and the second vibration is excited by a second excitation unit.

5. The method of claim 1, wherein a presence of the buildup is determined based on a variance in a Fourier spectrum of the sensor signal.

6. The method of claim 1, wherein at least one of the first vibration and the second vibration is imparted at a frequency which increases from 0.1 Hz to 1 kHz.

7. The method of claim 1, wherein at least one of the first vibration and the second vibration is imparted at a frequency which increases from 1 to 50 Hz.

8. The method of claim 1, wherein the first vibration is caused by impulses imparted to the component.

9. The method of claim 4, wherein the first excitation unit and/or the second excitation unit impart the first and second vibrations, respectively, to the component at a resonance frequency of the component.

10. A computer program for removing buildup from a component, said computer program embodied in a non-transitory computer readable medium, wherein the computer program, when loaded into a processor unit and executed by the processor unit, causes the processor unit to perform the steps of:

imparting a first vibration to a component, said component subject to a buildup on an interior surface of said component, said component comprising a hopper or a grinding tube of a mill, detecting the first vibration of the component by a sensor operably connected to the exterior surface of the component, providing a sensor signal by the control device, detecting whether the buildup is present on the interior surface of the component based upon analysis of the sensor signal, and imparting a second vibration to the exterior surface of the component to remove the buildup on the interior surface of the component when the buildup on the interior surface of the component has been detected, wherein the second vibration is caused by impulses imparted to the component with a continuous increase in frequency of the second vibration as a function of time such that a time interval between said impulses decreases, wherein the continuous increase in the frequency of the second vibration results in excitation of resonance frequencies of the component.

* * * * *

UNITED STATES PATENT AND TRADEMARK OFFICE
CERTIFICATE OF CORRECTION

PATENT NO. : 11,548,043 B2
APPLICATION NO. : 16/644784
DATED : January 10, 2023
INVENTOR(S) : Andreas Procksch and Dan Niculae Fodor It is certified that error appears in the above-identified patent and that said Letters Patent is hereby corrected as shown below:

On the Title Page (30) Foreign Application Priority Data:
Replace ",,EP 17189596" with --EP 17189596.4--.

(57) ABSTRACT should read:
In a method for detecting and removing buildup on a component, a first vibration is imparted to a component of the system and the first vibration of the component is detected by a sensor. The sensor generates a sensor signal for transmission to a control device, which analyzes the sensor signal and determines whether a buildup is present on the component based upon the analysis of the sensor signal. A second vibration is imparted to the component to remove the buildup when the buildup has been detected.

In the Claims

In Column 10, Claim 10, Line 13 add after Line 12 --analyzing the sensor signal by the control device,--.

Signed and Sealed this
Seventh Day of March, 2023

Katherine Kelly Vidal
*Director of the United States Patent and Trademark Office*